US012746866B2

(12) United States Patent
Line et al.

(10) Patent No.: US 12,746,866 B2
(45) Date of Patent: Sep. 29, 2026

(54) SEATING ASSEMBLY HAVING LOWER LEG SUPPORT

(71) Applicant: Ford Global Technologies, LLC, Dearborn, MI (US)

(72) Inventors: Johnathan Andrew Line, Northville, MI (US); Jimmy Moua, Superior Township, MI (US); Chris Fredriksson, LaSalle (CA); S. M. Akbar Berry, Lasalle (CA)

(73) Assignee: Ford Global Technologies, LLC, Dearborn, MI (US)

(*) Notice: Subject to any disclaimer, the term of this patent is extended or adjusted under 35 U.S.C. 154(b) by 157 days.

(21) Appl. No.: 18/444,996

(22) Filed: Feb. 19, 2024

(65) Prior Publication Data

US 2025/0263000 A1 Aug. 21, 2025

(51) Int. Cl.

| | |
|---|---|
| ***B60N 2/90*** | (2018.01) |
| ***B60N 2/02*** | (2006.01) |
| *A47C 1/034* | (2006.01) |
| *A47C 7/50* | (2006.01) |

(52) U.S. Cl.

CPC ......... *B60N 2/995* (2018.02); *B60N 2/02258* (2023.08); *A47C 1/034* (2013.01); *A47C 7/50* (2013.01); *B60N 2/0284* (2013.01); *B60N 2205/35* (2013.01)

(58) Field of Classification Search

CPC ........ B60N 2/995; B60N 2/0284; A47C 7/50; A47C 7/5062; A47C 7/5064; A47C 7/5066; A47C 7/5068; A47C 1/034; A47C 1/037

See application file for complete search history.

(56) References Cited

U.S. PATENT DOCUMENTS

| | | | | |
|---|---|---|---|---|
| 3,794,381 | A * | 2/1974 | Caldemeyer | A47C 7/5068 297/423.22 |
| 7,229,134 | B2 * | 6/2007 | Ito | B60N 2/309 297/69 |
| 9,399,418 | B2 * | 7/2016 | Line | B60N 2/0284 |
| 9,566,888 | B2 * | 2/2017 | Kolich | B60N 2/02246 |
| 9,649,962 | B2 | 5/2017 | Line et al. | |
| 11,634,057 | B2 * | 4/2023 | Stahl | B60N 2/02258 297/423.32 |
| 2009/0091172 | A1 * | 4/2009 | Kim | B60N 2/0284 297/337 |
| 2019/0106038 | A1 | 4/2019 | Rose et al. | |
| 2024/0217421 | A1 * | 7/2024 | Schmidt | B60N 3/001 |

FOREIGN PATENT DOCUMENTS

| | | |
|---|---|---|
| CN | 219029213 U | 5/2023 |

* cited by examiner

*Primary Examiner* — Syed A Islam
(74) *Attorney, Agent, or Firm* — Vichit Chea; Price Heneveld LLP

(57) ABSTRACT

A seating assembly includes a seat frame, a seat pan coupled with the seat frame, a leg extension assembly coupled with the seat pan, and a calf support assembly disposed under the leg extension assembly and translatable relative to the seat pan. The calf support assembly includes a calf support rotatable about a rotation axis. The rotation axis is translatable relative to the seat pan.

20 Claims, 7 Drawing Sheets

SEATING ASSEMBLY HAVING LOWER LEG SUPPORT

FIELD OF THE DISCLOSURE

The present disclosure generally relates to a vehicle seating assembly and, more particularly, to a vehicle seating assembly that includes an adjustable lower leg support assembly.

BACKGROUND OF THE DISCLOSURE

Conventional vehicle seating can include a set base, a seat back, and a leg support supporting a user's legs. An enhanced support arrangement for the legs of a user is desired.

SUMMARY OF THE DISCLOSURE

According to a first aspect of the present disclosure, a seating assembly includes a seat frame, a seat pan coupled with the seat frame, a leg extension assembly coupled with the seat pan, and a calf support assembly disposed under the leg extension assembly and translatable relative to the seat pan. The calf support assembly includes a calf support rotatable about a rotation axis. The rotation axis is translatable relative to the seat pan.

Embodiments of the first aspect of the present disclosure can include any one or a combination of the following features:

- the calf support assembly includes at least one guide sleeve coupled to one of the seat pan and the leg extension assembly and at least one rod coupled to the calf support and slidable through the guide sleeve;
- a motor operably coupled with the at least one rod and configured to move the at least one rod through the at least one guide sleeve to translate the calf support;
- the motor is configured to translate the rotation axis relative to the leg extension assembly;
- one rod includes a first rod disposed adjacent one side of the seating assembly and configured to engage the first guide sleeve of the at least one guide sleeve and a second rod disposed adjacent an opposing side of the seating assembly and configured to a second guide sleeve of the at least one guide sleeve;
- a crossmember extending laterally between the first rod and the second rod;
- the motor is disposed centrally between the first rod and the second rod;
- a mount extending substantially parallel to the crossmember between the first and second guide sleeves;
- the motor is disposed in the mount;
- the mount is coupled to an underside of the leg extension assembly;
- an actuator disposed in the calf support and configured to drive rotation of the calf support about the rotation axis; and
- a motor configured to translate the leg extension assembly in a fore-aft direction independent of translation of the rotation axis.

According to a second aspect of the present disclosure, a seating assembly includes a seat frame, a seat pan coupled with the seat frame, a leg extension assembly coupled with the seat pan, a calf support operably coupled with the seat pan and pivotable about a rotation axis, and a guide sleeve disposed under the seat pan configured to receive a rod coupled with the calf support. The rod is slidable within the guide sleeve to allow translation of the rotation axis.

Embodiments of the second aspect of the present disclosure can include any one or a combination of the following features:

- a motor operably coupled with the rod and configured to move the rod through the guide sleeve to translate the calf support;
- a mount coupled to the seat pan, wherein the guide sleeve is coupled with the mount;
- the motor is disposed in the mount;
- the motor is configured to translate the rotation axis relative to the leg extension assembly;
- an actuator disposed in the calf support and configured to drive rotation of the calf support about the rotation axis; and
- a motor configured to translate the leg extension assembly in a fore-aft direction independent of translation of the rotation axis.

According to a third aspect of the present disclosure, a seating assembly includes a seat frame, a seat pan coupled with the seat frame, a leg extension assembly coupled with the seat pan, and a calf support assembly disposed under the seat pan. The calf support assembly includes a first guide sleeve disposed adjacent one side of the seating assembly, a second guide sleeve disposed adjacent an opposing side of the seating assembly, a first rod slidably disposed in the first guide sleeve, a second rod slidably disposed in the second guide sleeve, and a calf support coupled with the first and second rods and translatable relative to the seat pan. The seating assembly includes an actuator operably coupled with the first and second rods and is configured to move the first and second rods through the first and second guide sleeve to translate the calf support.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
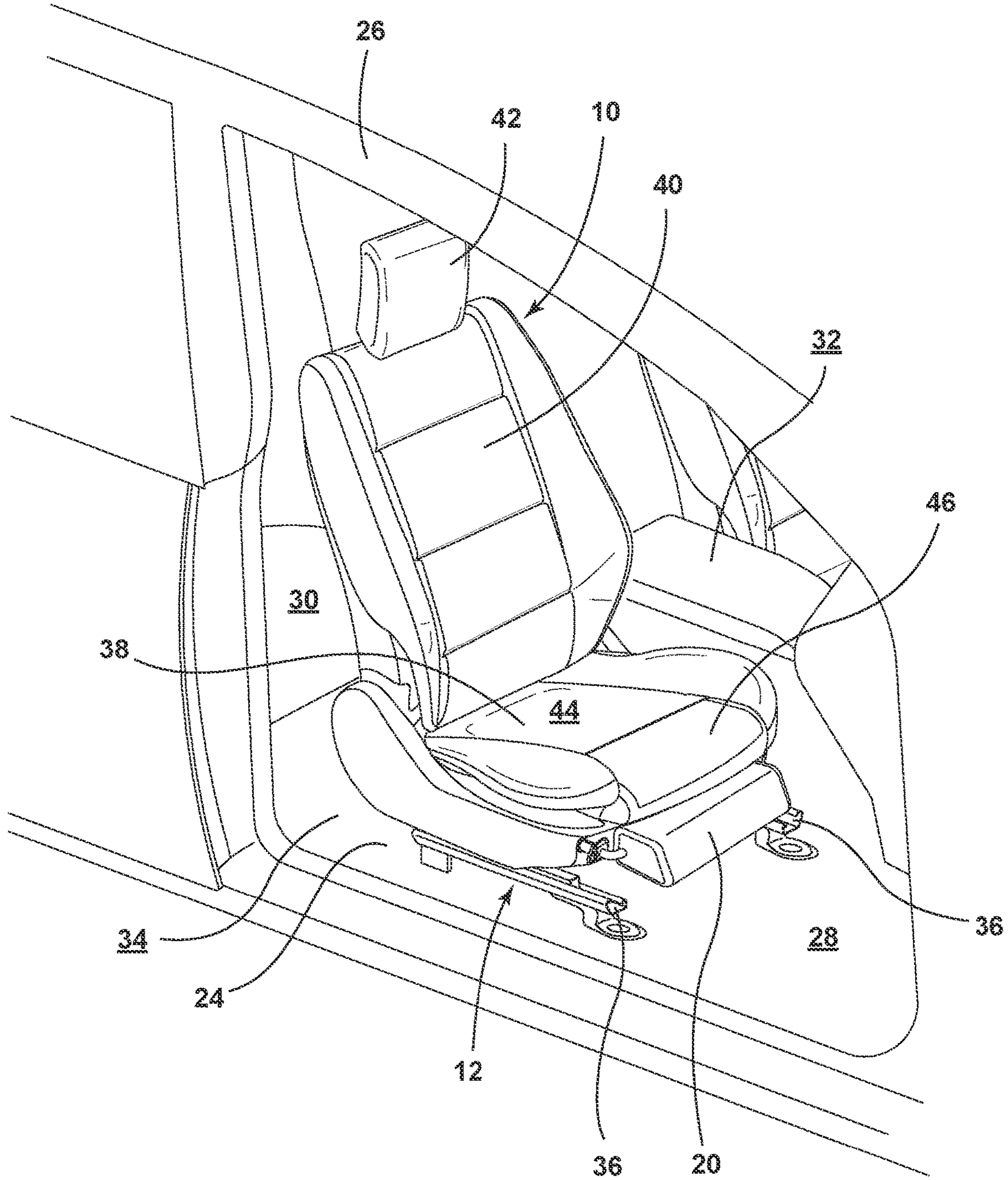
FIG. 1 is a perspective view of a seating assembly disposed in a vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly having lower leg support. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-6D, reference numeral 10 generally designates a seating assembly 10. The seating assembly 10 includes a seat frame 12 and a seat pan 14 coupled with the seat frame 12. A leg extension assembly 16, otherwise referred to herein as a first support assembly 16, or upper support assembly 16, is coupled with the seat pan 14. A calf support assembly 18, otherwise referred to herein as a second support assembly 18, or lower support assembly 18, is disposed under the leg extension assembly and is translatable relative to the seat pan 14. The calf support assembly 18 includes a calf support 20 rotatable about a rotation axis 22. The rotation axis 22 is translatable relative to the seat pan 14.

In general, the present arrangement of the seating assembly 10 may provide for enhanced spacing between the seating assembly 10 and a floor 24 of a vehicle 26 to allow deployment of the calf support assembly 18. Further, the modular arrangement of the seat pan 14 with the calf support assembly 18 and the leg extension assembly may provide for enhanced room in the vehicle 26 in which the seating assembly 10 is arranged.

Referring to FIG. 1, the seating assembly 10 may be positioned in a vehicle 26 and defines a front 28, a rear 30, a first side 32, and a second side 34 opposing the first side 32. The front-rear-side orientations may correspond to the features of a user sitting in the seat 38, with sides 32, 34 corresponding to arm positions (e.g., armrests), the front 28 referring to anterior relative to the frontal plane of the user, and the rear 30 referring to posterior relative to the frontal plane of a user. The seating assembly 10 is coupled with the vehicle 26 via the seat frame 12 which includes a pair of glide assemblies 36 secured to a floor 24 of the vehicle 26. The seating assembly 10 includes a seat 38 and a seat back 40 that supports a headrest 42 thereon. The seat back 40 is pivotally coupled with the seat 38, such that the seat back 40 can be moved between upright and inclined positions. The seat 38 includes a seat base 44 and a seat extension 46 moveable relative to the seat base 44. Although covered by seat extension 46 in FIG. 1, the upper support assembly 16 may be operably coupled with the seat extension 46 and extend and retract the seat extension 46. The lower support assembly 18 is disposed on an underside 48 of the seat pan 14 and includes the lower leg support 20 nested underneath the seat 38. The lower support assembly 18 is moveable relative to the seat 38 to support lower legs of a user. In particular, the lower leg support 20 may be moved forward and rotated to support portions of the user's leg generally below the knee (e.g., calves, ankles).

Figure 2:
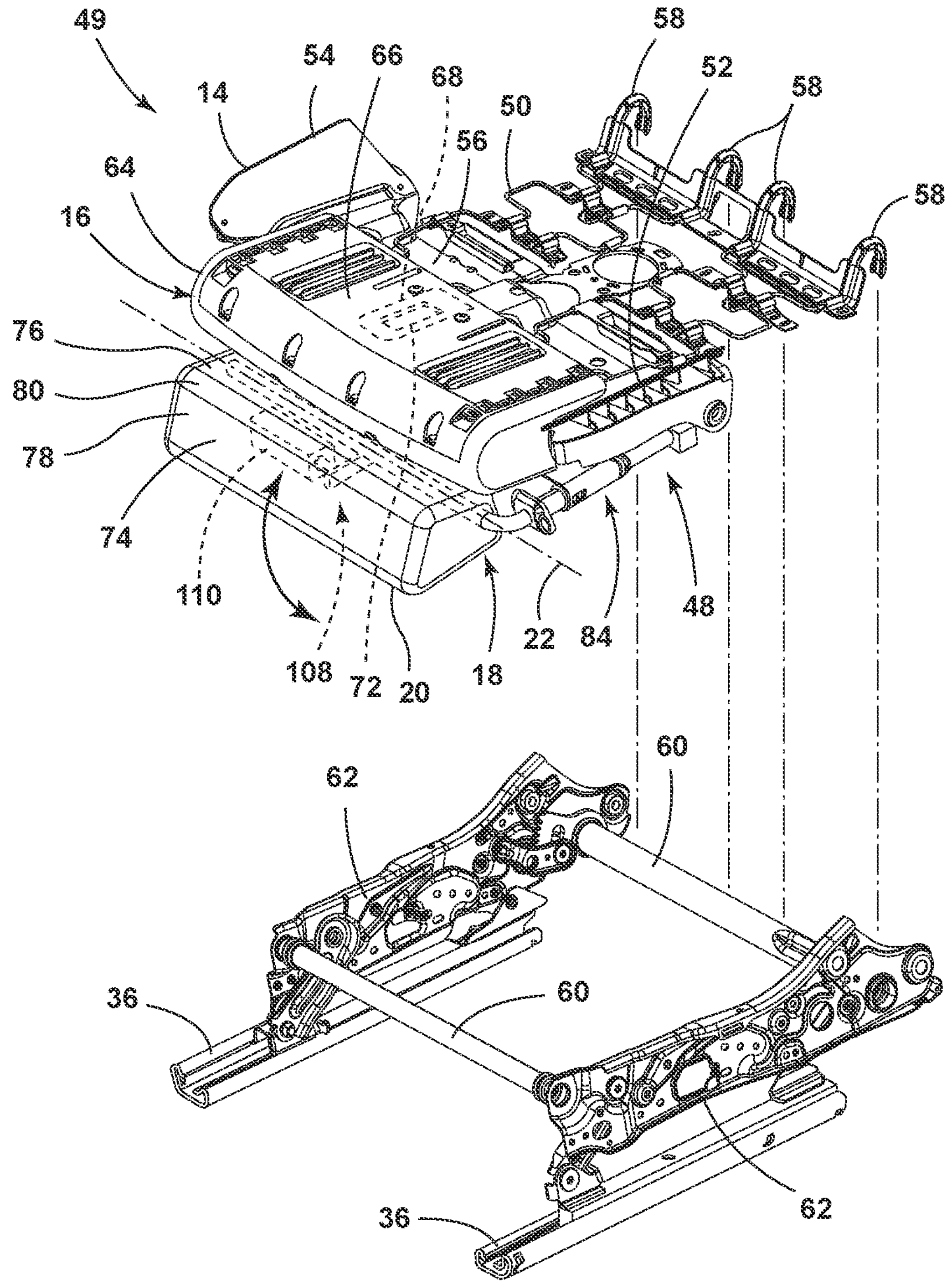
FIG. 2 is a partially-exploded perspective view of the seating assembly of FIG. 1 showing a seat subassembly and a seat frame of the seating assembly.

Referring now to FIG. 2, a seat subassembly 49 that includes the seat pan 14, the upper support assembly 16, and the lower support assembly 18 includes a spring assembly 50 positioned between the seat frame 12 and the seat base 44. The spring assembly 50 is provided under upholstery and/or cushioning or other finishes of the seat 38 for supporting a user in the seat 38. The seat pan 14 includes first and second wings 52, 54 that extend from a body 56 of the seat pan 14 and are configured to support side cushions of a seat cushion over the seat base 44. The seat cushion is supported above the spring assembly 50.

The spring assembly 50 includes one or more clasps 58 disposed at the rear 30 of the seating assembly 10 and configured to engage with a brace 60 of the seat frame 12. The seat pan 14 engages another brace 60 so that the seat subassembly 49 is supported from the floor 24 of the vehicle 26 by the seat frame 12. The seat frame 12 also includes a pair of sleds 62 that engage the pair of glide assemblies 36 to allow forward-rearward translation of the seating assembly 10 relative to the floor 24.

Still referring to FIG. 2, the upper support assembly 16 includes an upper leg support 64 that includes a structure 66 that approximately spans a width of the seat subassembly 49. A first actuation unit 68 is disposed between the upper leg support 64 and the body 56 of the seat pan 14 to provide translational movement of the upper support assembly 16 in a forward-rearward direction relative to the seat pan 14 and therefore, the seat base 44. Because the structure 66 spans the width of the seat subassembly 49, the upper support assembly 16 may be configured to move as one, or as a one-piece unit, between forward and rearward positions. In other words, one side of the upper support assembly 16 may not move independently relative to another side of the upper support assembly 16. Accordingly, the first actuation unit 68 may be centrally disposed (e.g., along a lateral midline 70 of the seat subassembly 49) to provide for balanced forward-rearward movement. In another example, the first actuation unit 68 includes a plurality of actuators distributed width-wise, with each configured to drive one side of the upper support assembly 16.

The first actuation unit 68 can include any electromechanical actuators and/or gearing coupled with a first actuator 72 to allow the first actuator 72 to interact with the body 56 or the structure 66. By way of example, the first actuator 72 may be a motor configured to drive a ball screw. The motor may be disposed in the body 56. For example, a motor may be housed in a cavity defined by the body 56 disposed on the lateral midline 70, and the ball screw may extend into the structure 66 whereby, upon rotation of the shaft of the motor, the ball screw drives the structure 66 forward or rearward. The motor and ball-screw arrangement is merely exemplary and non-limiting. Other mechanisms, such as pneumatic systems, pulley systems, or any other mechanical interface may be provided in the first actuation unit 68 to allow for manual and/or automatic translation of the upper support assembly 16 relative to the seat pan 14.

Referring generally to FIG. 2-5, the lower leg support 20 of the lower support assembly 18 includes a cushion, or bun 74, having a generally elongated shape. Further, the bun 74 may define a crosssection having a length and depth that are substantially equal or unequal (e.g., a square crosssection). In the present example, the bun 74 has an oblong trapezoidal crosssection shape. The bun 74 has a first surface 76 and a second surface 78 separated by an edge 80 therebetween. The bun 74 is rotated in a fore-aft movement about the rotational axis 22 as will be described in relation to FIGS. 6A-6D, which modifies the orientations of the first and second surfaces 76, 78 relative to the seat pan 14. For example, in an aft position (FIGS. 6A and 6B), the first surface 76 faces forward and is presented substantially in view from the front 28 while the second surface 78 faces generally upwardly. In a fore position (FIGS. 2-5, 6C, and 6D), the first surface 76 faces substantially forward and is presented in view while the second surface 78 faces generally upwardly. The second surface 78 is configured to support the lower leg of a user in the seating assembly 10, such as in a reclined position of the seating assembly 10. For example, the second surface 78 can engage the calves of a user to lift or otherwise suspend the user's feet from the floor 24. It is contemplated that such reclining and/or suspension during use of the lower support assembly 18 may only be implemented when the vehicle 26 is stationary or otherwise not in use for travel or operation.

Figure 3:
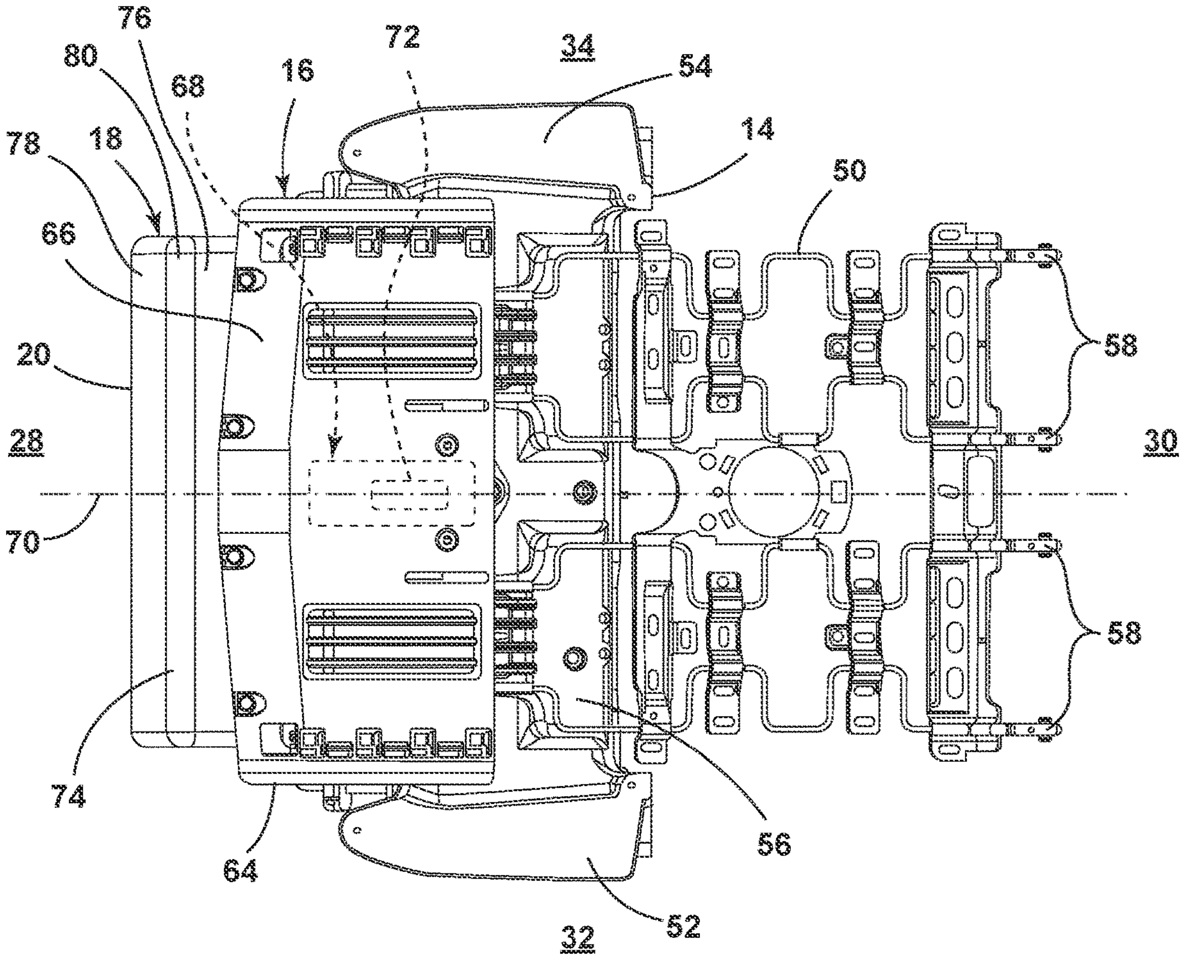
FIG. 3 is a top plan view of the seat subassembly of FIG. 2.
Figure 4:
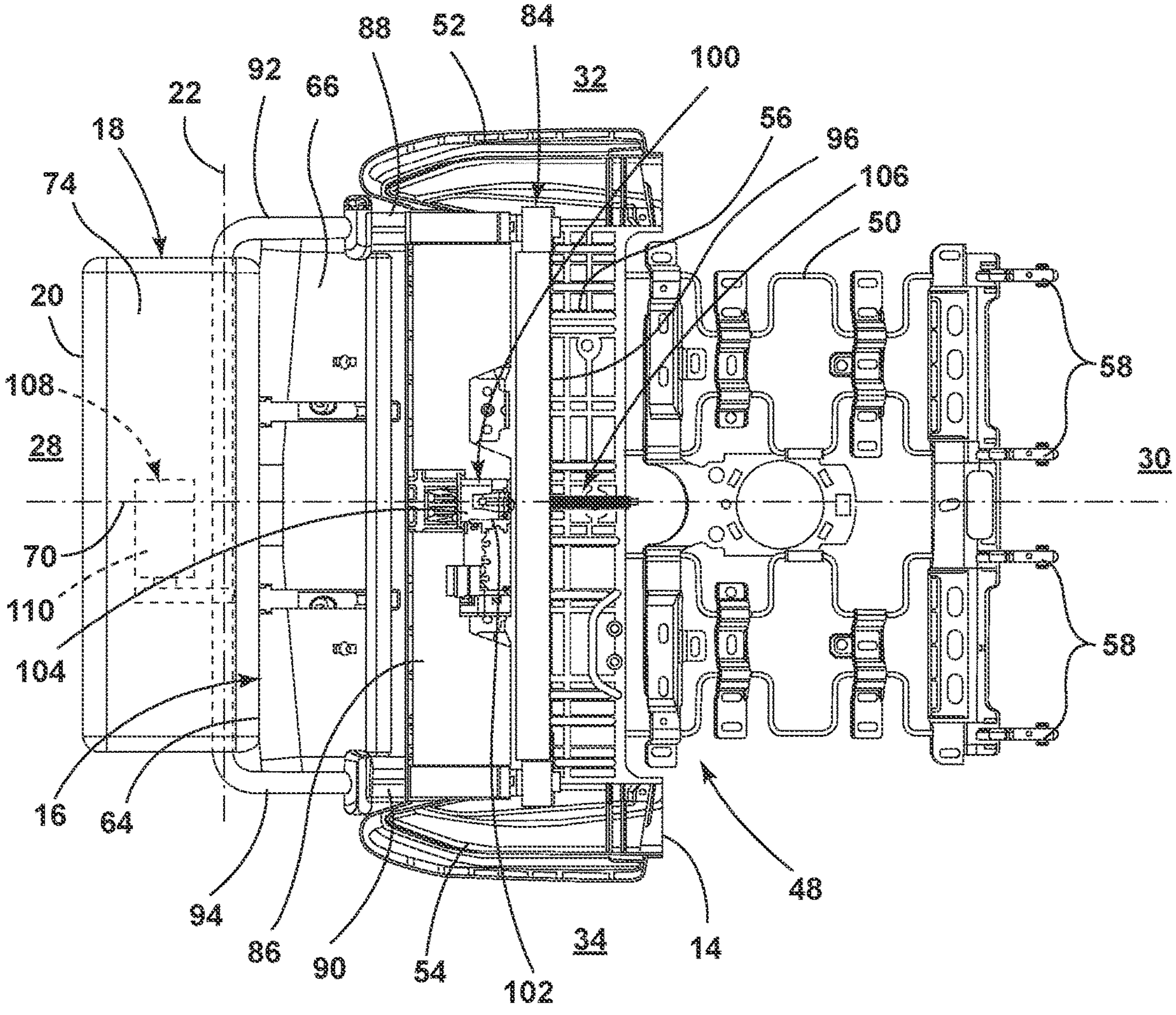
FIG. 4 is a bottom plan view of the seat subassembly of FIG. 3 with a lower leg support of the seat subassembly in a fully deployed position.
Figure 5:
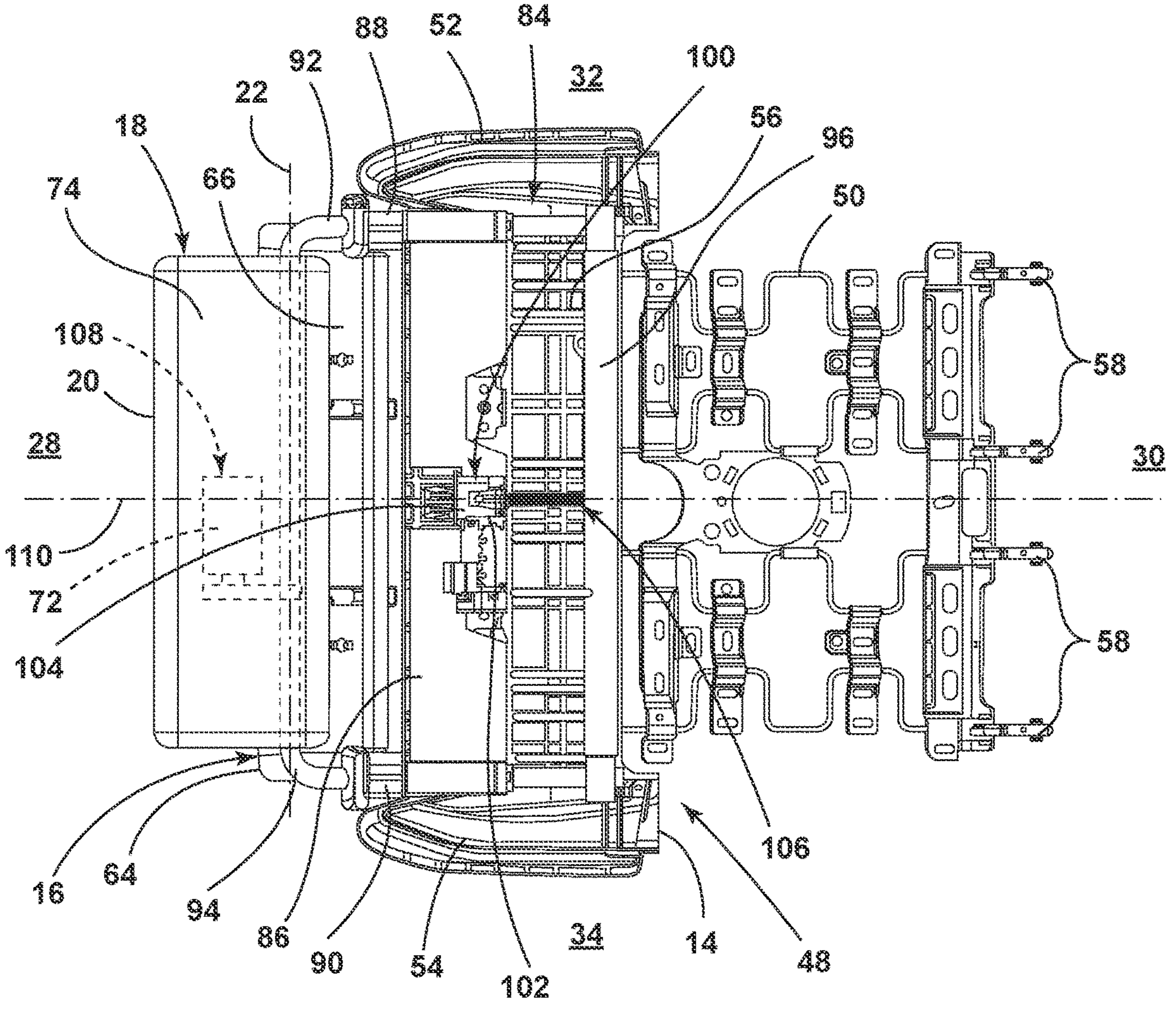
FIG. 5 is a bottom plan view of the seat subassembly of FIGS. 3 and 4 with the lower leg support in a fully undeployed position.
Figure 6A:
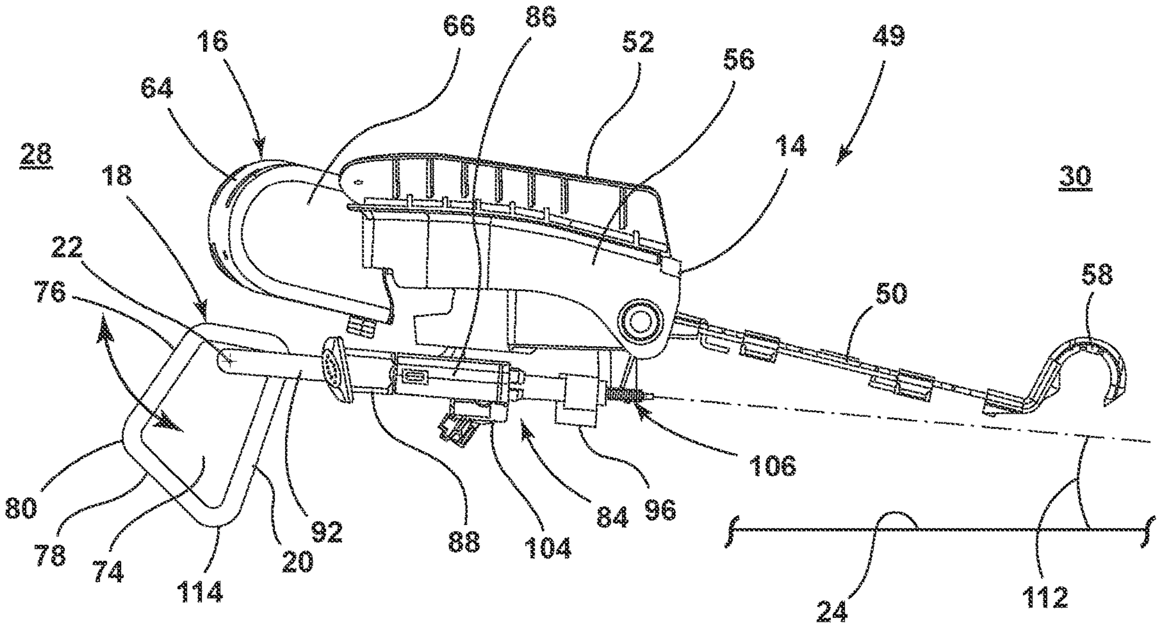
FIG. 6A is a side plan view of the seat subassembly of FIG. 3 with the lower leg support in an aft, partially-deployed position and the upper leg support in a rearward position.
Figure 6B:
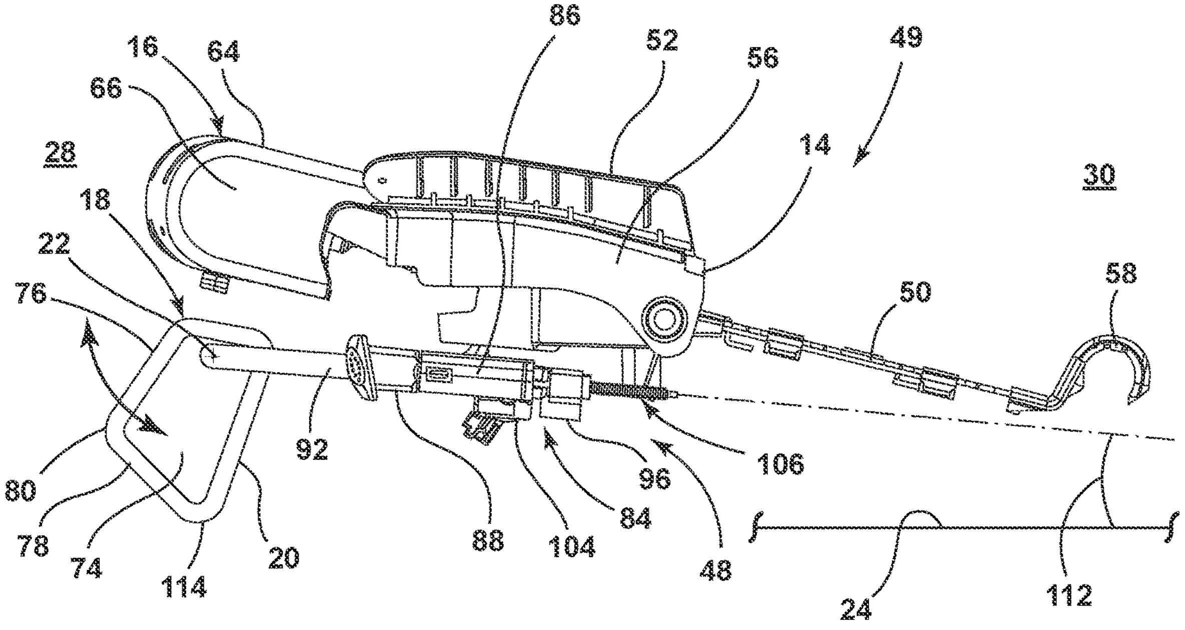
FIG. 6B is a side plan view of the seat subassembly of FIG. 3 with the lower leg support in an aft, fully-deployed position and the upper leg support in a forward position.
Figure 6C:
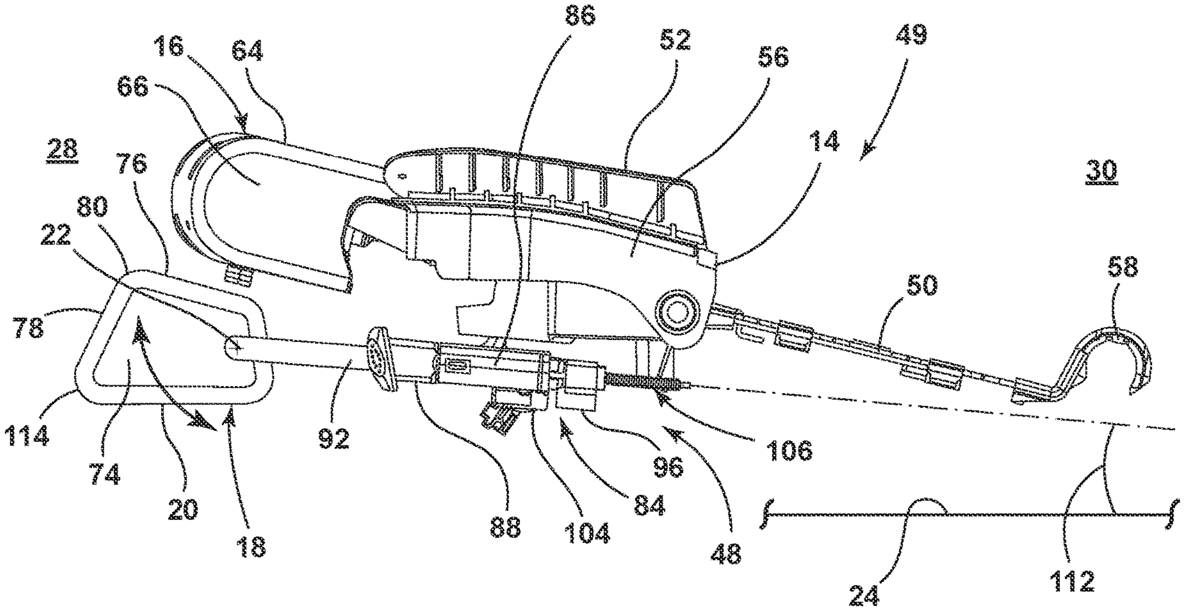
FIG. 6C is a side plan view of the seat subassembly of FIG. 3 with the lower leg support in a fore, fully-deployed position and the upper leg support in the forward position.
Figure 6D:
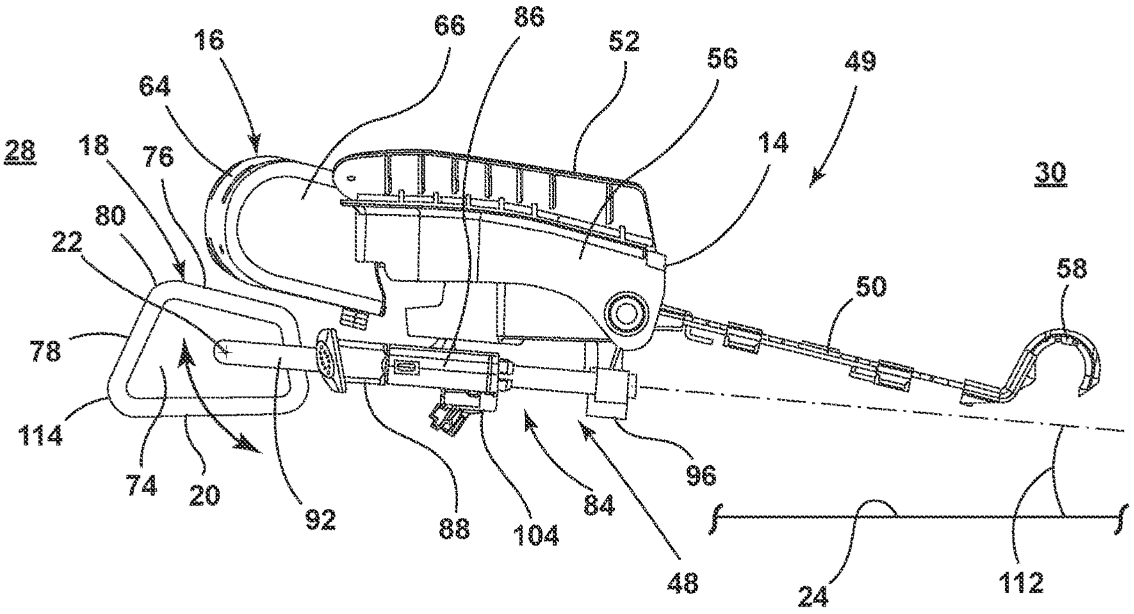
FIG. 6D is a side plan view of the seat subassembly of FIG. 3 with the lower leg support in a fore, undeployed position and the upper leg support in a rearward position.

Referring generally to FIGS. 2-6D, the lower support assembly 18 also includes a slide 84 under the seat pan 14 that couples with the lower leg support 20 to move the lower leg support 20 between a fully undeployed position (FIGS. 5 and 6D) and a fully deployed position (FIGS. 4, 6B, and 6C). A partially deployed position (FIG. 6A) refers to any position between the undeployed and deployed position. The fully deployed and fully undeployed positions may refer to maximum strokes of the lower leg support 20.

Referring more particularly to FIG. 4, the slide 84 is disposed on the underside 48 of the seat pan 14. The slide 84 includes a mount 86, or anchorage, that is fixed with the seat pan 14 and extends laterally between the first side 32 and the second side 34. A first guide sleeve 88 and a second guide sleeve 90 are operably coupled to the mount 86 adjacent the first and second sides 34, respectively. First and second rods 92, 94 are slidably disposed in the first and second guide sleeves 88, 90 and are operably coupled together via a crossmember 96 extending therebetween the mount 86 extends substantially parallel with the cross member 96. The crossmember 96 is fixed with the rods 92, 94 adjacent a first end of each rod 92, 94 such that the rods 92, 94 move in the guide sleeves 88, 90 in unison. While the crossmember 96 maintains alignment of the first and second rods 92, 94 at the crossmember 96, toward the front 28, the rods 92, 94 include curved portions 98 at second ends of each rod 92, 94 that face one another and engage or pass into the lower leg support 20, such that sliding movement of the rods 92, 94 results in translation of the lower leg support 20. It is contemplated that, though referred to as first and second rods 92, 94, the first and second rods 92, 94 may be portions of a common, continuous linkage that extends through the bun 74 (FIG. 3).

The slide 84 includes a second actuation unit 100 configured to drive the rods 92, 94 through the guide sleeves 90. The second actuation unit 100 includes a second actuator 102 that may comprise any of the mechanisms previously described with respect to the first actuator 72 but is exemplarily a motor mounted 86 beneath the seat pan 14. For example, a base 104 may be provided on the mount 86 for supporting the second actuator 102. A transmission arrangement 106 may be provided between the second actuator 102 and the crossmember 96, such that when the second actuator 102 actuates, the transmission arrangement 106 transfers or translates the actuation into forward or rearward movement of the crossmember 96 and, therefore, the lower leg support 20. For example, a ball screw or other transmission element may be provided to translate rotational motion into linear motion.

The second actuator 102 is located proximate to the lateral midline 70 to limit the slide 84 from "dresser-drawing." For example, the second actuator 102 may drive the first and second rods 92, 94 relatively equally between the fully undeployed and the fully deployed positions. It is contemplated that more than one second actuator 102 may be provided in the second actuation unit 100 for driving the slide 84.

In some examples, the slide 84 is directly coupled with the upper support assembly 16. In such an example, the mount 86 is fastened to a bottom surface of the structure 66. In such an example, the stroke of the slide 84 may be reduced, as translation of the upper leg support 64 between forward and rearward positions may provide sufficient movement for the lower leg support 20 to rotate. Thus, the slide 84 may be omitted in this example.

As illustrated in FIGS. 2 and 4, a third actuation unit 108 is provided in the lower leg support 20 for driving rotation of the bun 74 to pivotably more the calf support assembly 18 relative to the rotation axis 22, which is formed between the curved portions 98 of the rods 92, 94. The third actuation unit 108 may include any of the mechanisms previously described with respect to the first and second actuation units 68, 100. For example, a third actuator 110 may be provided in the lower leg support 20 such that, upon actuation, the bun 74 rotates in the fore-aft direction. In another example, a manual interface (e.g., a lever, a knob, etc.) is provided to rotate the bun 74 between a fore position and an aft position.

Referring now to FIGS. 6A-6D, an exemplary motion between deployed and undeployed positions and fore and aft positions of the lower leg support 20, as well as motion of the upper leg support 64 between a rearward position and a forward position, is demonstrated. In FIG. 6A, the lower leg support 20 is translated away from the fully undeployed position (e.g., a nested position), as demonstrated by the position of crossmember 96 in FIG. 5 relative to the position of the crossmember 96 in FIG. 6A. During deployment of the lower leg support 20, the upper leg support 64 is moveable from the rearward position to the forward position. While these movements may be independent, a controlled software routine to move or a coordinated movement established via electrical communication may cause the seating assembly 10 to recline, extend the upper leg support 64, and deploy the lower leg support 20 concurrently.

Once the lower leg support 20 is fully deployed (FIG. 6B), space between the floor 24 of the vehicle 26 and the lower leg support 20 may be sufficient to allow rotation of the lower leg support 20. Because the various components (e.g., the upper support assembly 16 and the lower support assembly 18) generally provides translational movement at an oblique angle 112 relative to the floor 24 of the vehicle 26, forward movement of these components may increase clearance from the floor 24. For example, a closest potential contact point 114 between the floor 24 and the bun 74 may, along a rotational path, intersect with the floor 24 in the undeployed position. However, in the fully or partially deployed positions, the closest potential contact point 114 is free from engagement with the floor 24 due to the radial spacing between the rotation axis 22 and the floor 24.

As illustrated in FIG. 6C, the lower leg support 20 is fully deployed and in the fore position. In this position, the second surface 78 may support the calves of the user. For example, the second surface 78 may incline relative to the floor 24 and be positioned forward of the upper leg support 64. Accordingly, a reclined position may be achieved. As demonstrated in FIG. 6D, when the lower leg support 20 is in the fore position, it may be returned to the undeployed position. Thus, although referred to as "undeployed," the lower support assembly 18 may still support the lower legs of a user. When nested beneath the upper support assembly 16. In this example, a target position of the seating assembly 10 may be a not-fully-reclined position, as the upper leg assembly is also in the rearward position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
a seat frame;
a seat pan coupled with the seat frame;
a leg extension assembly coupled with the seat pan;
a calf support assembly disposed under the leg extension assembly and translatable relative to the seat pan, wherein the calf support assembly includes a calf support rotatable about a rotation axis, and wherein the rotation axis is translatable relative to the seat pan; and
an electromechanical actuator disposed in the calf support and configured to drive rotation of the calf support about the rotation axis.

2. The seating assembly of claim 1, wherein the calf support assembly includes at least one guide sleeve coupled to the leg extension assembly and at least one rod coupled to the calf support and slidable through the guide sleeve.

3. The seating assembly of claim 2, further comprising:
a motor operably coupled with the at least one rod and configured to move the at least one rod through the at least one guide sleeve to translate the calf support.

4. The seating assembly of claim 3, wherein the motor is configured to translate the rotation axis relative to the leg extension assembly.

5. The seating assembly of claim 3, wherein the at least one rod includes:
a first rod disposed adjacent one side of the seating assembly and configured to engage the first guide sleeve of the at least one guide sleeve; and
a second rod disposed adjacent an opposing side of the seating assembly and configured to a second guide sleeve of the at least one guide sleeve.

6. The seating assembly of claim 5, further comprising:
a crossmember extending laterally between the first rod and the second rod.

7. The seating assembly of claim 6, wherein the motor is disposed centrally between the first rod and the second rod.

8. The seating assembly of claim 3, wherein the motor is disposed in the mount.

9. The seating assembly of claim 1, further comprising:
a motor configured to translate the leg extension assembly in a fore-aft direction independent of translation of the rotation axis.

10. The seating assembly of claim 2, wherein the leg extension assembly includes an upper leg support, wherein a first actuation unit disposed between the upper leg support and a body of the seat pan provides translational movement to the leg extension assembly relative to the seat pan.

11. The seating assembly of claim 10, wherein the seating assembly further comprises:

a mount fastened to a bottom surface of a structure of the upper leg support and that extends laterally between a first side and a second side of the seating assembly.

12. A seating assembly comprising:

a seat frame;

a seat pan coupled with the seat frame;

a leg extension assembly coupled with the seat pan, the leg extension assembly including an upper leg support, wherein a first actuation unit disposed between the upper leg support and a body of the seat pan provides translational movement to the leg extension assembly relative to the seat pan;

a calf support operably coupled with the seat pan and pivotable about a rotation axis;

a guide sleeve disposed under the seat pan configured to receive a rod coupled with the calf support, where the rod is slidable within the guide sleeve to allow translation of the rotation axis;

a mount fastened to a bottom surface of a structure of the upper leg support and that extends laterally between a first side and a second side of the seating assembly, and wherein the guide sleeve is operably coupled to the mount; and an electromechanical actuator disposed in the calf support and configured to drive rotation of the calf support about the rotation axis.

13. The seating assembly of claim 12, further comprising:

a motor operably coupled with the rod and configured to move the rod through the guide sleeve to translate the calf support.

14. The seating assembly of claim 13, wherein the motor is disposed in the mount.

15. The seating assembly of claim 13, wherein the motor is configured to translate the rotation axis relative to the leg extension assembly.

16. The seating assembly of claim 12, further comprising:

a motor configured to translate the leg extension assembly in a fore-aft direction independent of translation of the rotation axis.

17. A seating assembly comprising:

a seat frame;

a seat pan coupled with the seat frame;

a leg extension assembly coupled with the seat pan, the leg extension assembly including an upper leg support, wherein a first actuation unit disposed between the upper leg support and a body of the seat pan provides translational movement to the leg extension assembly relative to the seat pan; and a calf support assembly disposed under the seat pan including:

a first guide sleeve disposed adjacent a first side of the seating assembly;

a second guide sleeve disposed adjacent a second side of the seating assembly;

a first rod slidably disposed in the first guide sleeve;

a second rod slidably disposed in the second guide sleeve;

a calf support coupled with the first and second rods and translatable relative to the seat pan;

a crossmember extending between and operably coupling together the first rod and the second rod;

a mount fastened to a bottom surface of a structure of the upper leg support and that extends laterally between the first side and the second side of the seating assembly, and wherein the first guide sleeve and the second guide sleeve are operably coupled to the mount; and a first actuator operably coupled with the first and second rods and configured to move the first and second rods through the first and second guide sleeves to translate the calf support between an undeployed position and a deployed position, and wherein the mount extends substantially parallel to the crossmember when the calf support has been deployed by the actuator.

18. The seating assembly of claim 17, further comprising:

an electromechanical actuator disposed within the calf support and configured to drive rotation of the calf support about a rotational axis of the calf support between a fore position and an aft position, wherein the calf support is restricted from rotating about the rotational axis until the calf support has been translated to the deployed position by the first actuator.

19. The seating assembly of claim 18, wherein the calf support comprises:

a bun that has an oblong trapezoidal cross-sectional shape and forms a first surface and a second surface separated by an edge, wherein the rotational movement of the calf support modifies the orientations of the first and second surfaces.

20. The seating assembly of claim 17, further comprising:

an electromechanical actuator disposed in the calf support and configured to drive rotation of the calf support about the rotation axis.

* * * * *